(12) United States Patent
Orban

(10) Patent No.: US 6,671,057 B2
(45) Date of Patent: Dec. 30, 2003

(54) GRAVITY AND DIFFERENTIAL GRAVITY SENSOR, AND SYSTEM AND METHOD FOR MONITORING RESERVOIRS USING SAME

(75) Inventor: Andre E. Orban, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 169 days.

(21) Appl. No.: 09/999,792

(22) Filed: Oct. 31, 2001

(65) Prior Publication Data

US 2003/0081218 A1 May 1, 2003

(51) Int. Cl.⁷ .............................. G01B 9/02; E21B 44/00
(52) U.S. Cl. ................... 356/496; 73/152.46; 73/382 R
(58) Field of Search ............... 356/495, 28.5; 73/382 R, 382 G, 152.54, 152.43, 152.46

(56) References Cited

U.S. PATENT DOCUMENTS

| | | | |
|---|---|---|---|
| 3,704,626 A | * | 12/1972 | Stone ....................... 73/382 R |
| 5,351,122 A | | 9/1994 | Niebauer et al. |
| 5,461,914 A | | 10/1995 | Zumberge et al. |
| 5,495,547 A | | 2/1996 | Rafie et al. |
| 5,892,151 A | | 4/1999 | Niebauer et al. |
| 5,970,787 A | | 10/1999 | Wignall |

FOREIGN PATENT DOCUMENTS

JP 2-126181 5/1990

* cited by examiner

Primary Examiner—Frank G. Font
Assistant Examiner—Patrick Connolly
(74) Attorney, Agent, or Firm—Victor H. Segura; Brigitte L. Jeffery; John J. Ryberg (57) ABSTRACT

A gravity sensor is disclosed which includes a first mass adapted to free fall when selectively released from an initial position. The mass has optical elements adapted to change a length of an optical path in response to movement of the mass. The sensor output is coupled to a beam splitter. One output of the splitter is coupled substantially optically directly to an interferometer. Another output of the splitter is coupled to the interferometer through an optical delay line. A frequency of the interference pattern is directly related to gravity at the mass. A second such mass having similar optics, optically coupled in series to the first mass and adapted to change the path length in opposed sign, when selectively dropped to cause time coincident movement of the two masses, generates an interference pattern having frequency related to gravity difference.

32 Claims, 6 Drawing Sheets

GRAVITY AND DIFFERENTIAL GRAVITY SENSOR, AND SYSTEM AND METHOD FOR MONITORING RESERVOIRS USING SAME

BACKGROUND OF THE INVENTION

1. Field of the Invention

The invention relates generally to the field of well logging. More particularly, the invention relates to sensors for measuring acceleration due to earth's gravity, and application of such measurements to evaluation of subsurface earth formations.

2. Description of Related Art

Measurements of the earth's gravitational acceleration, and measurements of differences in the earth's gravitational acceleration (gravity difference) between different depths in the earth, can be useful in determining the bulk density (or specific gravity) of various earth formations, among other applications. More particularly, measurements of gravity difference between two positions or depths may be used to determine whether oil, water or gas primarily fills pore spaces in the earth formations at various depths and geographic locations in the earth.

As a practical matter, measuring any physical property of earth formations beneath the surface of the earth is typically performed by a process called "well logging", wherein instruments having various sensors therein are lowered into a wellbore drilled through the earth. The instruments may be lowered into the wellbore and retrieved therefrom at the end of an armored electrical cable, this process being known as "wireline" well logging. Alternative conveyance techniques known in the art include lowering the instruments into the wellbore coupled to the end of a drill pipe, a production tubing or a coiled tubing. The drill pipe conveyance technique, in particular, is commonly referred to as "logging while drilling" when performed during the actual drilling of a wellbore. The well logging instruments, whether wireline or pipe conveyed, may include various devices to measure the earth's gravitational acceleration.

One type of gravity and gravity difference measuring instrument is described in U.S. Pat. No. 5,892,151 issued to Niebauer et al. This instrument includes at least one, and preferably several longitudinally spaced apart gravity sensors enclosed in an instrument housing. The gravity sensors are fiber optic interferometry devices, which measure a velocity of a free falling mass by determining, with respect to time, interference fringe frequency of a light beam split between a first path having a length corresponding to the position of the free falling mass, and a second "reference" (fixed length) path. The fringe frequency is related to the velocity of the free falling mass, which can be correlated to earth's gravity by precise measurement of the mass's position and the time from the start of free fall. Measurement of gravity difference is performed by determining a difference in gravity measurements made between two of the individual gravity sensors positioned at vertically spaced apart locations.

One limitation to using gravity sensors such as those disclosed in the Niebauer et al. '151 patent is that the accuracy of the gravity measurement may be insufficient for making gravity difference measurements in boreholes. Typically, to be useful in determining density of earth formations adjacent to a wellbore, it is desirable to have gravity difference measurements made to a vertical separation of about 1 meter or less. Gravity measurement sensors of the type disclosed in the Niebauer et al '151 patent may have a noise level such that gravity difference between such small true vertical separations is below the needed accuracy for borehole applications. Another limitation to using the sensors such as disclosed in the Niebauer et al '151 patent is that each individual sensor requires a separate optical path between a light source and a light detector. In reservoir monitoring applications, which may require many such sensors positioned at vertically spaced apart positions along a wellbore, and perhaps many such sensor "strings" positioned within a plurality of such wellbores, signal transmission and processing may become very complicated. Furthermore, the implementation proposed in the Niebauer et al '151 patent suggests that a laser source be positioned near the individual sensor. Because may wellbores have high temperatures within them, positioning a laser source in a well logging instrument, and more particularly a well logging instrument that may be permanently installed in a wellbore, may be impracticable.

What is needed is a gravity sensor and differential gravity sensor having accuracy suitable for reservoir monitoring, and having improved resistance to environmental effects.

SUMMARY OF THE INVENTION

One aspect of the invention is a gravity sensor which includes a first mass adapted to free fall when selectively released from an initial position. The first mass has optical elements on it which are adapted to change a length of an optical path through the sensor in response to movement of the mass. The sensor output is coupled to a beam splitter. One output of the beam splitter is coupled substantially optically directly to an interferometer. Another output of the splitter is coupled to the interferometer through an optical delay line. A frequency of an interference pattern generated in the interferometer is directly related to gravity at the location of the free falling mass.

Another aspect of the invention is a gravity difference sensor. A second mass, adapted to free fall when selectively released and having similar optical elements on it as the first mass, is optically coupled in series with the first mass. The second mass is adapted to change the optical path length in opposed sign or sense to the change caused by the first mass when it is dropped. The second mass is selectively dropped to have at least partially time coincident movement of the first and second masses. An interference pattern generated in the interferometer in this case has a frequency related to gravity difference between the first mass and the second mass.

A method for measuring gravity according to another aspect of the invention includes illuminating optical elements on a first mass that is adapted to free fall when released from an initial position. The optical elements are adapted to change a length of an optical path in response to movement of the mass. The mass is dropped at a selected time. Light traveling away from the optical elements is split. One output of the splitting is conducted substantially directly to one input of an interferometer. Another output of the splitting is conducted to the interferometer through a selected time delay. A frequency of an interference pattern in the interferometer is then determined. The frequency of the interference pattern is related to gravity at the first mass.

A method for measuring gravity difference according to another aspect of the invention includes, prior to the splitting, directing the light leaving the optical elements on the first mass to optical elements on a second mass. The second mass is also adapted to free fall when selectively released from an initial position. The optical elements on the second mass are adapted to change the length of the optical path in response to movement of the second mass in opposite sign or sense to the length change caused in response to movement of the first mass. The second mass is selectively dropped. The selective dropping of the second mass is timed to enable at least partially time coincident movement of the first mass and the second mass. A frequency of an interference pattern in the interferometer is determined during the time coincident movement of the first and second masses. The time coincident movement interference pattern frequency is related to gravity difference between the first and second masses.

Other aspects and advantages of the invention will become apparent from the following description and the drawings.

DETAILED DESCRIPTION

Generally, embodiments of a gravity sensor according to the invention determine acceleration due to earth's gravity by an interferometry technique which includes passing a light beam from a source, such as a laser, onto a free falling mass/reflector. The free falling mass/reflector may be a mirror covered mass disposed in a vacuum chamber. The sensor includes other optical devices arranged such that when the mass/reflector falls it changes the length of a light path through the sensor.

The light which ultimately passes through the sensor is then split into two beams. One beam travels substantially directly to one input of an interferometer coupled to a photodetector, such as a photodiode. The other beam is passed through an optical delay line on its way to the other input of the interferometer. The optical delay line may be a selected length of optical fiber, for example. The direct beam and the delayed beam are then combined in the interferometer. A fringe frequency $f$ of the interference pattern generated by combining the direct and delayed light beams is related linearly to gravitational acceleration extant at the free falling mass/reflector by the expression:

$$f = 2g(T_d)/\lambda \quad (1)$$

where g represents the earth's gravitational acceleration, $T_d$ represents the time delay in the optical delay line, and $\lambda$ represents the wavelength of the light from the source. Notably, the frequency $f$ of the interference pattern is proportional also to the time delay $T_d$. As can be inferred from this relationship, the sensitivity of measurements made by a sensor according to the invention will be increased as the selected time delay $T_d$ is increased. A limit to the time delay, however, is the total fall time of the mass having the optical elements thereon. Therefore, in one embodiment, the time delay is selected to be at most to equal to the expected fall time of the mass, and more preferably slightly less than the expected fall time. This provides the highest sensitivity to the measurement. The expected fall time may be determined from the distance that the mass is adapted to fall in any embodiment of the sensor, and an approximate value of earth's gravitational acceleration.

Other embodiments of a sensor according to the invention can directly make gravity difference measurements. In embodiments of a gravity difference sensor according to the invention, a first free falling mass/reflector, which may be similar to the type such as is used to measure gravity described above, is combined in optical series with a second free falling mass/reflector along the same overall light path. One of the two free falling mass/reflectors is arranged so that by its falling, the length of the light path increases through the sensor. The other free falling mass/reflector is arranged so that the length of the light path is shortened as the free falling reflector drops. As in the gravity-measuring embodiments, the light path is then split into two beams after it passes through the reflector apparatus and exits the sensor. One beam from the splitter is time delayed, and the other beam passes substantially directly to an interferometer. As in the other embodiments, the delayed beam is combined with the direct beam in the interferometer. In gravity difference sensor embodiments, the fringe frequency of the interference pattern output from the interferometer is related linearly to the difference in gravity extant between each of the two free falling mass/reflectors, such as by the expression:

$$f = 2(g_1 - g_2)T_d/\lambda \quad (2)$$

In the above expression, $g_1$ represents earth's gravity at the position of the first free falling mass/reflector, and $g_2$ represents earth's gravity at the position of the second free falling mass/reflector. In order to determine gravity difference, it is only necessary to have both free falling reflectors falling during some coincident time period. The resulting interferometry will provide a measurement that is directly related (in frequency) to the gravity difference between the positions of the two mass/reflectors. As in the gravity-measuring embodiment referred to earlier, a preferred amount for the time delay is at most approximately equal to the expected fall time of either the first mass or the second mass, and is more preferably less than the expected fall time.

Figure 1:
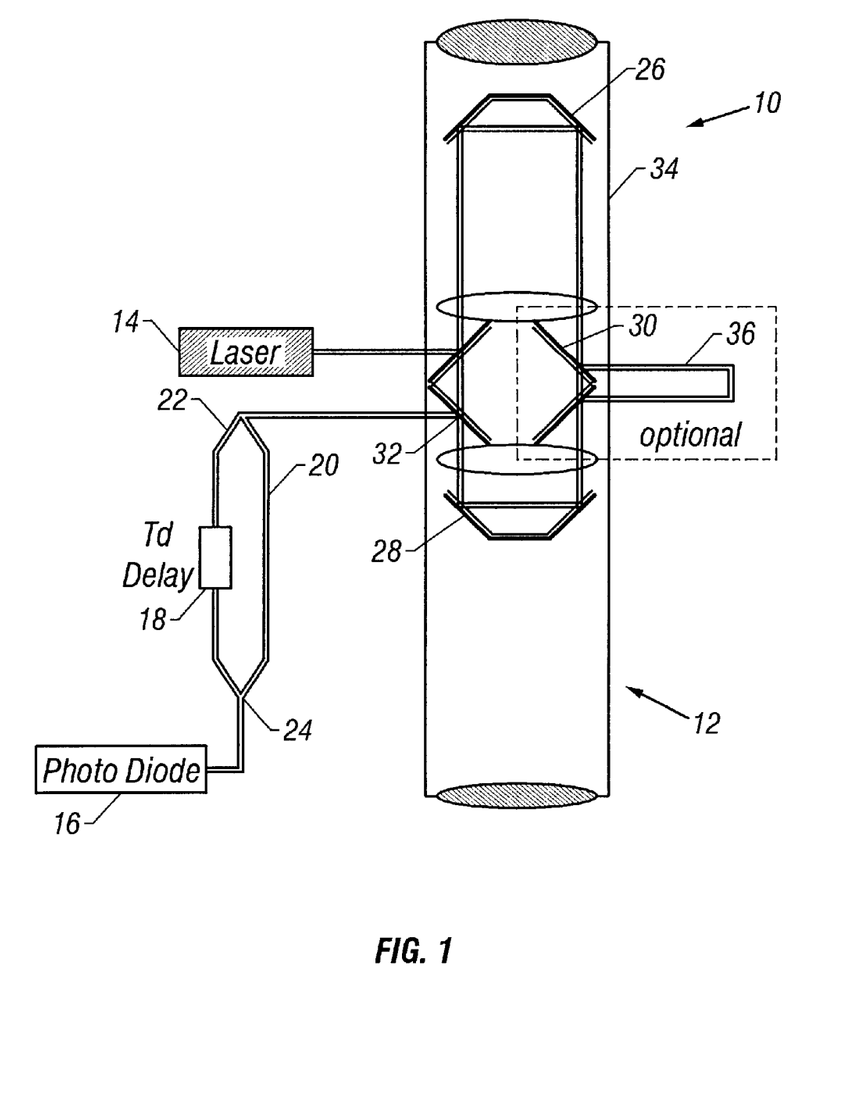
FIG. 1 shows a schematic diagram of one example of a combined gravity/gravity difference sensor.

A basic configuration of one embodiment of a gravity sensor and a gravity difference sensor according to the invention is shown schematically in FIG. 1. A gravity sensor having a first "sign", "sense" or "polarization" (meaning the change in the length of the light path through the sensor when the mass/reflector is dropped) is shown at 10. The sensor 10 includes a reflector coupled to a mass, shown in combination at 26 and referred to for convenience as a reflector. The reflector 26 is adapted to be moved to the top of a sensor housing 34 and dropped at a selected time. For purposes of clarity of the description, a mechanism used to move the reflector and drop it is not shown in FIG. 1, but will be explained in more detail later herein. The sensor housing 34 is typically evacuated so that the mass/reflector 26 will essentially free fall, unimpeded by friction, when dropped by the mechanism (not shown). While the description of the mass/reflector combination 26 is referred to herein for convenience as a "reflector", it should be clearly understood that any combination of optical elements coupled to the mass which results in a change in length of the optical path through the sensor 10 when the mass moves may be used in other embodiments of the invention. Accordingly, the invention is not limited only to embodiments which couple reflectors to the mass, but may alternatively include prisms, lenses, or any similar optical elements which enable light entering the sensor to traverse a path which is affected in overall length by the position of the mass.

When the mass/reflector 26 is dropped, the length of the light path decreases within the sensor 10 between the mass/reflector 26 and an optical target 30. The optical target 30 and the mass/reflector 26 may additionally include any configuration of optical elements adapted to receive light from a source, such as a laser 14, and provide an output which includes an optical path that encompasses the distance between the mass/reflector 26 and the optical target 30. The sensor 10 shown in FIG. 1, which includes a decreasing length light path when the mass/reflector 26 is dropped, will be referred to for convenience later herein as a "type A" sensor. Optical elements on the mass/reflector 26 preferably include optical devices (not shown separately) which cause light to traverse the path between the target 30 and the mass/reflector 26 a plurality of times so that a small movement of the mass/reflector 26 causes a much larger overall change in length of the light path through the sensor 10.

As shown in FIG. 1, a light output of the first (type A) sensor 10 can be directly, or reflectively, coupled, as shown at 36, to a light input of a second sensor 12. The second sensor 12 may be enclosed in the same housing 34 or in a different housing as is the first sensor 10. In either case, the housing for the second sensor 12 should also be evacuated to enable substantially friction-free dropping of a mass therein. The second sensor 12 includes an optical target 32, which may be reflective as in the first sensor 10. The second sensor 12 includes a mass coupled to a reflector, shown generally at 28, which may be similar in configuration to the mass/reflector combination 26 disposed in the first sensor 10. The second sensor 12, however, is configured so that when its mass/reflector 28 is dropped, the length of the light path through the second sensor 12 increases, which is opposite in sense or sign to the change in optical path length for the first sensor 10. For convenience in the description which follows, a sensor having an increasing length light path upon dropping of the reflector/mass, such as the second sensor 12, will be referred to as a "type B" sensor. Even more generally speaking, the two types of sensors, type A and type B, each have a light path length which changes in opposite sign or sense to the other type of sensor in response to dropping the mass therein.

Just as is the case for the mass/reflector 26 in the first sensor 10, the mass/reflector 28 in the second sensor 12 may in various embodiments include any combination of optical elements adapted to change the length of the light path through the sensor 12 when the mass is dropped. Although the optical elements are reflectors in this embodiment, it should be understood that any combination of optical elements which results in the selected change of length of light path may be used in other embodiments of a sensor according to the invention.

In the embodiment shown in FIG. 1, therefore, a complete light path from source 14 to detector 16 includes both the first 10 and second 12 sensors coupled in optical series therein.

An optical output of the second sensor 12 in this embodiment is coupled to a beam splitter 22. The beam splitter 22 separates the output of the second sensor 12 so that it travels along one path relatively directly, such as over fiber optic line 20, to an interferometer 24 coupled to an optical detector 16. The detector 16 may be a photodiode or the like coupled to a processor (not shown) adapted to convert the detector 16 output into signals which may be processed to provide measurements of the earth's gravity and gravity difference at the sensors 10, 12. The other path from the beam splitter 22 passes through an optical delay line 18. The optical delay line 18 provides a predetermined amount of time delay, between the direct beam over fiber optic line 20 and the output of the delay line 18. The output of the delay line 18 is recombined with the direct beam at the interferometer 24. The detector 16 may generate a signal which corresponds to the amplitude of the light received from the interferometer 24. In some embodiments, the delay line 18 may be a fiber optic line having a preselected length. In some embodiments, the delay line 18 may be several km in length to provide a useful amount of time delay. In particular embodiments, the length of the delay line 18 is selected so that the amount of time delay is at most equal to, and more preferably is less than the expected fall time of either the mass/reflector 26 from the type A sensor, and/or the expected fall time of the mass/reflector 28 of the type B sensor.

It should be understood that the particular combined sensor construction of a gravity/gravity difference sensor, such as shown in FIG. 1 within a single housing, is not meant to limit the scope of the invention. A single sensor, configured such as the first sensor 10, (a type A sensor) may be directly optically coupled between the light source 14 and the beam splitter 22, to produce measurements which correspond to gravitational acceleration at the location of that sensor. Similarly, a sensor such as second sensor 12 (a type B sensor) may be directly optically coupled between the source 14 and the beam splitter 22 to produce measurements which correspond to gravitational acceleration at the position of the sensor 12. It is also within the scope of this invention that individual type A and type B sensors, which are disposed in separate housings, may be combined in optical series between a light source and photodetector such as shown in FIG. 1 so that gravity difference measurements may be made between the individual type A and type B sensors.

The combination of first sensor 10 and second sensor 12 in optical series as shown in FIG. 1 provides the capacity, as explained earlier herein, to provide a direct measurement of gravity difference between the positions of the first 10 and the second 12 sensors. All that is required to make such gravity difference measurements, as will be explained in more detail herein, is to have the mass/reflector combinations of both the first 10 and second 12 sensors falling during at least some coincident time interval. In operation of the embodiment shown in FIG. 1, the combined sensors 10, 12 are initialized so that the reflectors 26, 28 are in their uppermost positions. For the "type A" sensor 10, this is near the top of the housing 34. For the "type B" sensor 12, this is near the optical target 32. To make a measurement of gravity at the type A sensor 10, the first mass/reflector 26 is dropped, and the frequency of an interference pattern generated in the interferometer 24 is determined. Similarly, a measurement of gravity at the type B sensor 12 may be made by dropping the second mass/reflector 28 and determining the frequency of the interference pattern. To make a measurement of gravity difference between the type A sensor 10 and the type B sensor 12, the duration of the dropping of the first mass/reflector 26 need only partially overlap the duration of dropping of the second mass/reflector 28. During the overlap interval (the time coincident movement interval), difference in gravity between the type A sensor 10 and the type B sensor 12 can be determined by determining the frequency of the interference pattern.

Figure 1A:
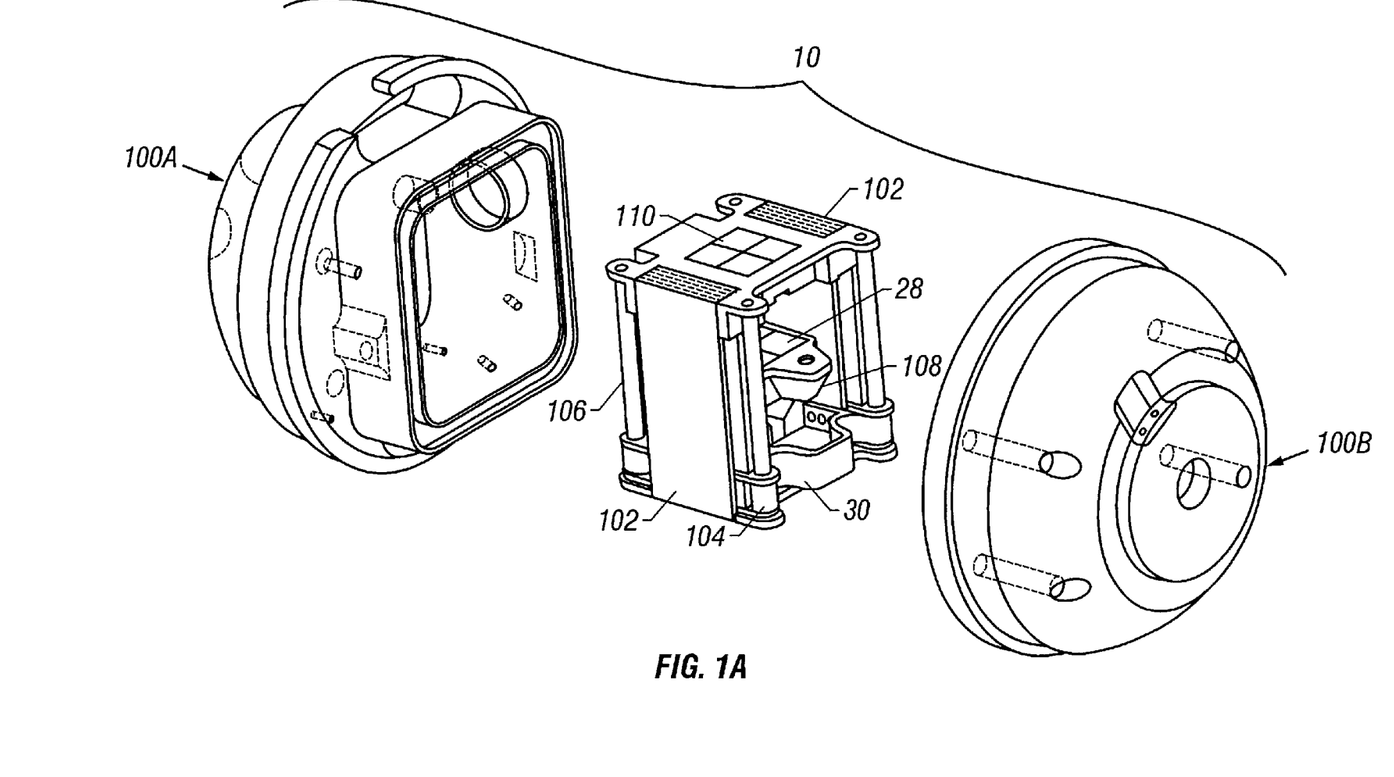
FIG. 1A shows an exploded view of one embodiment of a sensor such as in FIG. 1.

An exploded view of one embodiment of a sensor according to the invention is shown at 10 in FIG. 1A. The sensor 10 includes a vacuum chamber 100A, 100B adapted to enclose the active elements of the sensor, including, of course, the free falling mass/reflector assembly 28. The mass/reflector 28 is disposed inside a frame 106, which in this embodiment, includes permanent magnets 102 on either side thereof. The magnets 102 induce a magnetic field which may be perpendicular to the movement of the mass/reflector 28. A field coil 104 is disposed on the bottom of the frame 106. The field coil 104 is oriented such that energizing the coil 104 produces a transverse magnetic field. The transverse magnetic field lifts an elevator 108 disposed underneath the mass/reflector 28. When the elevator reaches the top of the frame 104, a small electromagnet 110 may be energized to hold the mass/reflector 28 in place at the top of the frame 104. Dropping the mass/reflector may be performed by deenergizing the electromagnet 110.

The embodiment of the sensor shown in FIG. 1A is only one example of a sensor including a mechanism for selectively dropping a mass having optical elements thereon. For purposes of the invention, any mechanism which can selectively drop, or raise and drop a mass having optical elements thereon will perform the necessary mass drop function of a gravity sensor according to the invention. Other types of mass "throw" and drop apparatus as known in the art. See, for example, U.S. Pat. No. 5,351,122 issued to Niebauer at al. For purposes of this invention, it is only necessary that the mass/optical element combination therein be allowed to free fall over a selected time interval. This may include dropping from an initial position, or throw and drop from an initial position.

Figure 4:
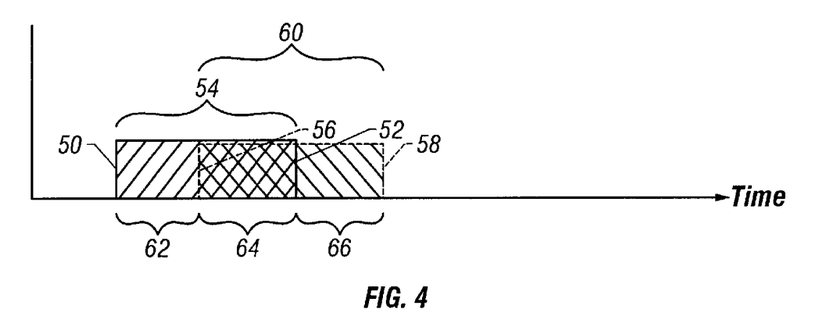
FIG. 4 shows an example timing diagram for movement of the mass/reflector combinations in the example sensor of FIG. 1.

One example of timing of dropping the masses, and resulting measurements made, is illustrated graphically in FIG. 4. An interval of time 54 from release 50 of the first mass/reflector (26 in FIG. 1) to the approximate end of its fall, shown at 52, is selected to partially overlap, shown at interval 64, an interval of time 60 extending from the dropping 56 of the second mass/reflector (28 in FIG. 1) to approximate end of its fall 58. During time interval 62, where the first reflector is falling and the second reflector is stationary, the output of the detector (16 in FIG. 1) corresponds to gravity at the first sensor (10 in FIG. 1). During the overlap interval 64, the output of the detector (16 in FIG. 1) corresponds to the difference in gravity between the first (10 in FIG. 1) and second (12 in FIG. 1) sensors. After the first mass/reflector (26 in FIG. 1) has ended its travel, but while the second mass/reflector (28 in FIG. 1) is still dropping, the output of the detector (16 in FIG. 1) then corresponds to gravity at the second sensor (12 in FIG. 1). It should be clearly understood that the mass/reflector drop timing shown in FIG. 4 is only one example of mass/reflector drop timing which may be used in various embodiments of the invention, and that such timing is not intended to limit the overall scope of the invention.

Figure 5:
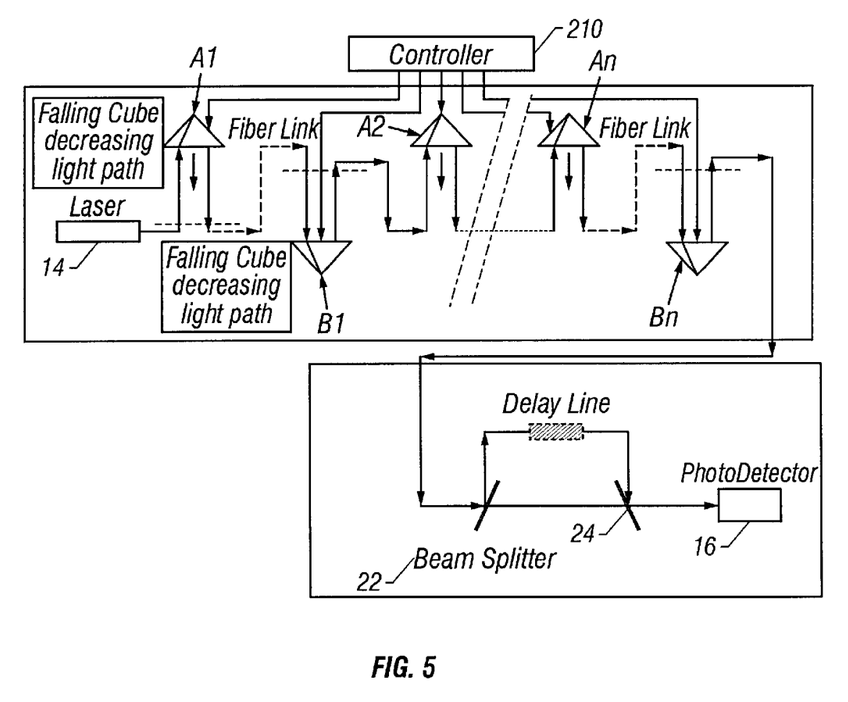
FIG. 5 shows an arrangement of sensors such as in FIG. 1 which can make a spaced apart array of gravity/gravity difference measurements using only a single optical channel.

Advantageously, embodiments of a gravity/gravity difference sensor according to the invention may include a plurality of type A and type B sensors combined in optical series along a light path from a source 14 to a detector 16 so that gravity and gravity difference measurements may be made at a plurality of different positions while using only one, extended length instrument. For example, as shown in FIG. 5, a light source 14 may be optically coupled, such as by optical fiber, to an input of a first type A sensor, shown at A1 (or a type B sensor, the exact order is unimportant for purposes of the invention). The output of the first type A sensor A1 may be coupled to an input of a first type B sensor, shown at B1. Gravity difference measurements may be made between the positions of sensors A1 and B2 by causing overlapping fall time of the mass/reflectors therein, as explained above. As shown in FIG. 5, the output of sensor B1 may be optically coupled to the input of a second type A sensor A2. Gravity difference measurements between sensors B1 and A2 may be made by causing overlapping mass/reflector fall time between sensors A2 and B1. Such a series of interconnected, alternating, type A and type B sensors may continue in any selected instrument to a selected number, n, of such sensors, connected in optical series between the source 14 and the detector 16. The n-th sensors in the series are indicated by An and Bn in FIG. 5. Advantageously, an instrument made according to the example embodiment shown in FIG. 5 may make a plurality of spaced apart gravity/gravity difference measurements using only a single overall optical path between the source 14 and the detector 16.

One example of a system which causes the respective sensors to drop at selected times can be a single drop controller 210 operatively coupled to each sensor. Alternatively, each sensor may be coupled to a source of an initialization signal, such as a voltage pulse, and each can be under control of and individual sensor controller (not shown) adapted to release the associated mass/reflector at a preselected time delay after detection of the initialization pulse.

Figure 5A:
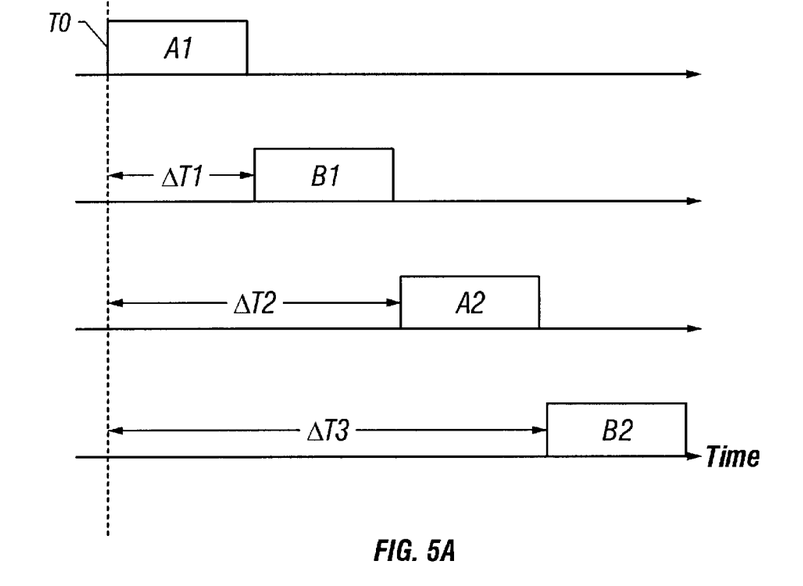
FIGS. 5A and 5B show example drop timing for the arrangement of sensors of FIG. 5.

An example of mass/reflector drop timing which will provide gravity measurements at each of the sensors of the arrangement of FIG. 5 is shown schematically in FIG. 5A. The first one of the sensors (A1 in FIG. 5) in the optical series is actuated to drop its mass/reflector at an initial time T0. The time interval during which the mass/reflector falls is shown by the length along the time axis of bar A1 in FIG. 5A. This time interval will be dependent on gravity, but can be reasonably accurately estimated. Dropping the mass/reflector can, for example, in the embodiment of FIG. 1A, include releasing the electromagnet (110 in FIG. 1A). The drop controller (210 in FIG. 5) in the instrument can be programmed to sequentially release the masses in each of the series-subsequent sensors B1, A2, B2, etc. after corresponding selected delay times $\Delta T1$, $\Delta T2$, $\Delta T3$, etc. Alternatively, each sensor A1, B1, A2, B2, . . . An, Bn, may include a programmer or controller (not shown) which deenergizes the associated electromagnet after a selected time delay after an initialization event, such as a clock pulse generated at T0. In the gravity measuring timing sequence of FIG. 5A, each mass/reflector is dropped such that there is substantially no time coincidence of movement of any two of the mass/reflector combinations. In this case, the interference pattern generated in the interferometer (24 in FIG. 1) corresponds to gravity at the position of the mass which is moving at any point in time.

Figure 5B:
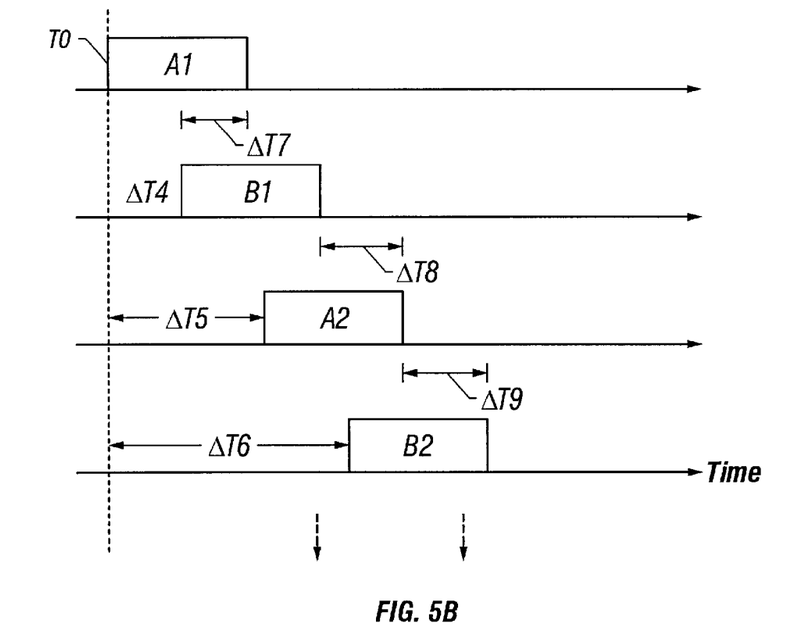

The mass/reflector drop timing may alternatively be arranged, as shown for example in FIG. 5B, to enable gravity difference measurement between pairs of adjacent sensors. In FIG. 5B, the first mass/reflector is dropped at T0. The mass/reflector of the next sensor B1 is dropped after a time delay $\Delta T4$ selected so that the mass in the first sensor A1 is still moving. Because sensor B1 has opposite sense change in light path length to the length change of sensor A1, during a time-coincident mass-movement interval $\Delta T7$ the output of the interferometer represents difference in gravity between sensor A1 and sensor B1. After the mass in sensor A1 has stopped moving, but before the mass in sensor B2 has stopped moving, shown in FIG. 5B as after time delay ΔT5, the mass in the next sensor A2 is dropped. Sensor A2 has change in length opposite in sense to that of sensor B1. During the time-coincident movement interval indicated by ΔT8, the output of the interferometer represents the difference in gravity between sensor B1 and A2. The sequence is repeated for sensors A2 and B2 as shown by time delay ΔT6 and time coincident movement interval ΔT9. This type of timing sequence can be repeated for all the sensors up to An, Bn in any particular well logging instrument.

Figures 2, 3:
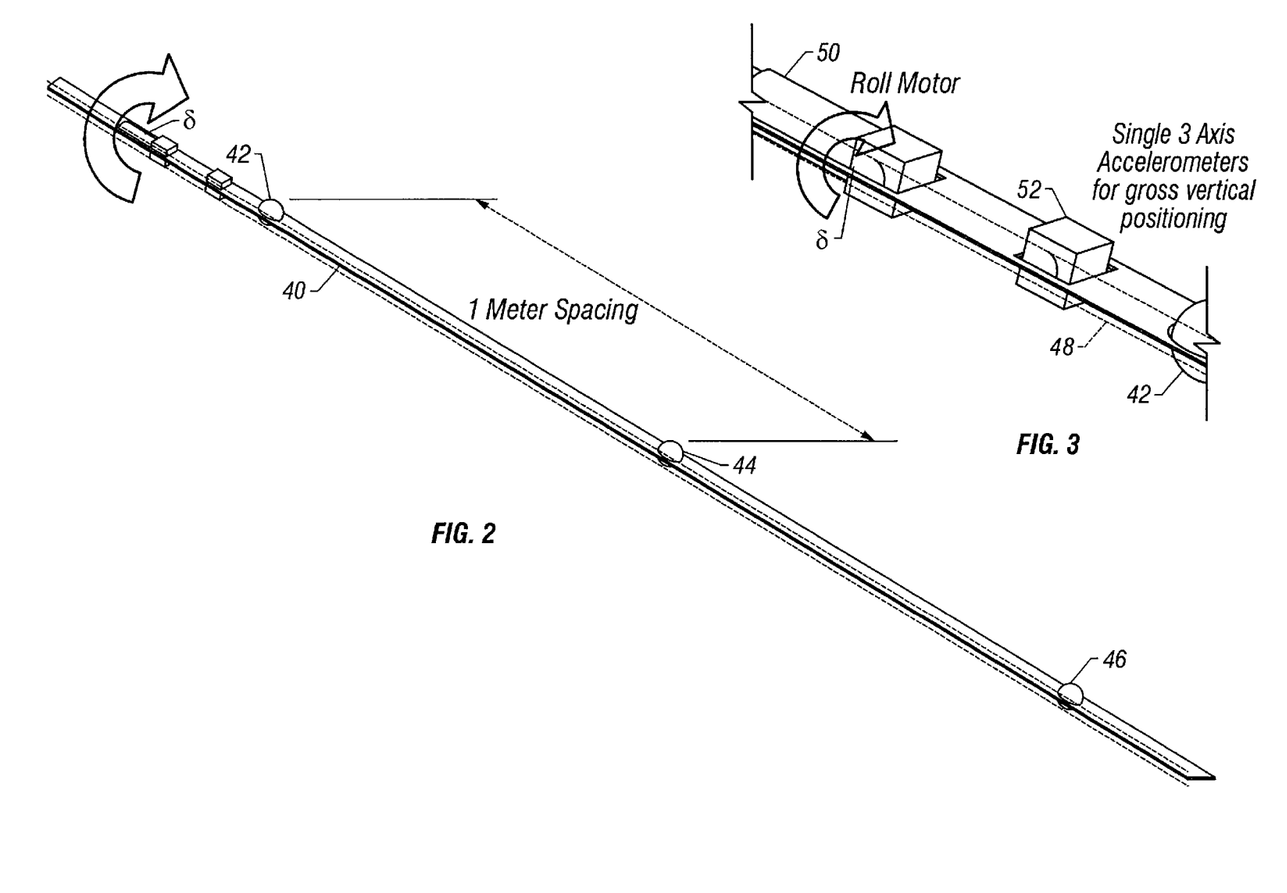
FIG. 2 shows an example well logging instrument including one or more of the sensors shown in FIG. 1.
FIG. 3 shows an example of an internal chassis for a logging instrument such as shown in FIG. 2.

An example of a well logging instrument which includes a plurality of combination type A and type B sensors is shown in FIG. 2. The instrument in this example includes a plurality of combination type A/type B sensors 42, 44, 46 positioned within an instrument housing 40 at axially spaced apart positions. An example spacing between the sensors 42, 44, 46 is one meter, but the spacing between the sensors 42, 44, 46 is not intended to limit the scope of the invention. The instrument housing 40 may be adapted to be lowered into a wellbore (not shown in FIG. 2) at the end of an armored electrical cable, at the end of a drill pipe or coiled tubing, or by any other conveyance known in the art for moving instruments through wellbores. The sensors 42, 44, 46 in this embodiment are combination type A and type B sensors, such as shown in FIG. 1, but it should be understood that individual type A and type B sensors could also be positioned such as shown in FIG. 2.

A more detailed view of part of an instrument chassis on which the sensors 42, 44, 46 are mounted is shown at 48 in FIG. 3. The chassis 48 is disposed inside the instrument housing (40 in FIG. 2). The portion of the chassis 48 shown in FIG. 3 includes one of the combination type A/type B sensors 42. When used in a well logging instrument, it is desirable to mount the sensors 42 (and 44, 46 in FIG. 2) within a movable framework, such as a gimbal mount, that enables the sensors to be oriented vertically, even when the instrument housing (40 in FIG. 2) is not oriented vertically. Such movable frameworks are well known in the art. See for example, U.S. Pat. No. 5,970,787 issued to Wignall. Some movable frameworks enable orientation only along two of three orthogonal axes. To enable vertical orientation of each sensor irrespective of the rotational orientation of the instrument housing within a wellbore, the embodiment shown in FIG. 3 includes a motor 50 adapted to rotate the chassis 48 about its axis inside the housing (40 in FIG. 2), so that the movable framework enclosing each sensor 42 can be rotated to a substantially vertical orientation. Proper rotary orientation may be determined, for example, by gravity measurements made from a sensor adapted to determine a direction of earth's gravity, such as a triaxial accelerometer 52 of any type well known in the art. Such triaxial accelerometers, for example, are used in directional drilling instruments. The triaxial accelerometer 52 provides measurements which ultimately indicate the approximate direction of earth's gravity vector relative to the instrument. The roll motor 50 turns the chassis 48 in response to the gravity vector determination until the chassis 48 is oriented with respect to gravity such that the sensors 42 (arid 44, 46 from FIG. 2) are substantially vertically oriented. When properly oriented, with triaxial accelerometers, tilt meters (not shown), for example, can be used to further position each sensor vertically. When oriented vertically, the sensors 42 (and 44, 46 from FIG. 2) may be operated to make gravity and gravity difference measurements.

The triaxial accelerometer 52 may also provide measurements which indicate the inclination of the instrument housing (40 in FIG. 2) from vertical. As will be appreciated by those skilled in the art, the true difference in vertical position between any of the sensors on the logging instrument is related both to the axial spacing between them, and the instrument inclination from vertical. Gravity difference measurements made between any two sensors are in many cases correlated to the true vertical spacing between the sensors.

Figure 6:
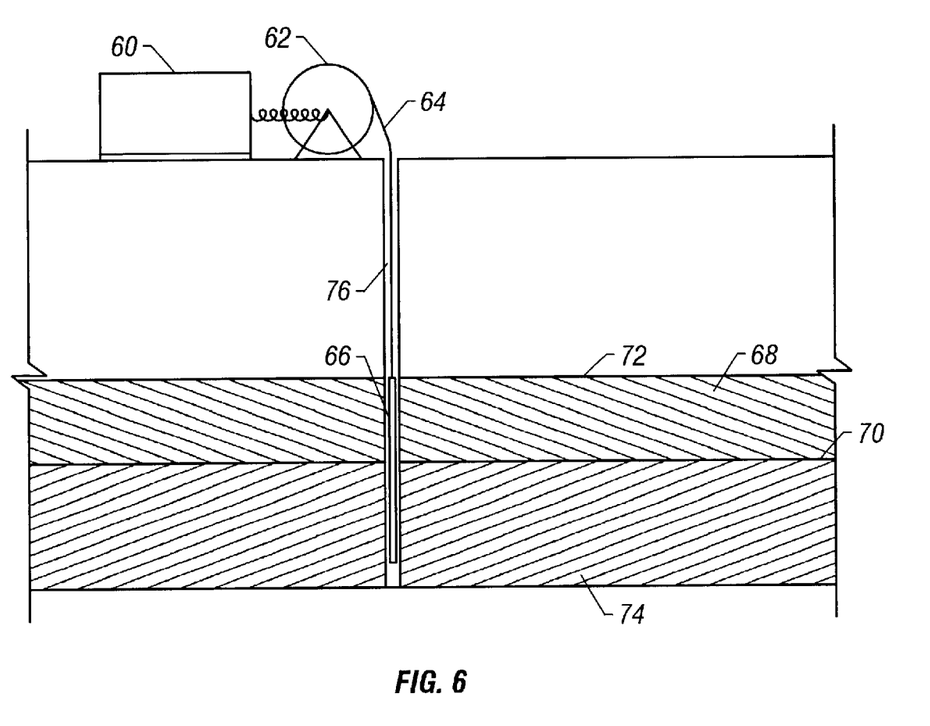
FIG. 6 shows an instrument such as the one in FIG. 2 inserted into a wellbore for monitoring a reservoir.

One example of using a well logging instrument, such as the one described with reference to FIGS. 2 and 5, is shown in FIG. 6. In FIG. 6, a gravity/gravity difference well logging instrument 66 is lowered into a wellbore 76 drilled through earth formations 68. The instrument 66 is attached to one end of an armored electrical cable 64 that is spooled and unspooled by a winch 62 or similar conveyance known in the art. Electrical power for the instrument 66, and signal recording and decoding equipment are typically disposed in a surface recording unit 60. The wellbore 76 in FIG. 6 is shown penetrating a reservoir which includes, in this example, a water/gas contact 70 generally disposed between a hydrocarbon bearing zone 72 and a water bearing zone 74. The instrument 66 may be lowered to a depth within the wellbore so that it traverses the expected position of the contact 70 between the hydrocarbon bearing zone 72 and the water bearing zone 74. Then the instrument 66 is actuated so that at least gravity difference measurements are made along the length of the instrument 66. A record may be made in the recording unit 60 of gravity difference with respect to depth in the wellbore 76. Gravity difference will change abruptly at the position of the hydrocarbon/water contact 70, because, as is known in the art, gravity difference corresponds to density of the formations between the sensors on the instrument. Generally speaking, there is a change in density across the contact 70. The depth position of the contact 70 may be noted, and at a later time, the process of measuring gravity difference may be repeated to determine movement of the contact 70 as hydrocarbons are removed from the hydrocarbon bearing zone 72. Those skilled in the art will readily appreciate that the contact 70 may also be a gas/oil contact, or an oil water contact. Repeating measuring gravity difference at selected times enables determining if such a contact has moved in the intervening time.

In the event that any particular wellbore includes more than one contact, the instrument may be moved along the wellbore to the expected depth of such contact and the measurement process can be repeated.

Some reservoirs, as is well known in the art, are drained by a plurality of wellbores, or may include some wellbores drilled therethrough for the purpose of enabling monitoring instruments to traverse the reservoir. The instrument shown in FIG. 6 may, in these cases, be inserted into a plurality of wellbores, including producing wellbores and monitoring wellbores. The spatial distributions of any gas/oil or hydrocarbon water contacts may then be determined by determining the depths of such contacts in each of the wells in which the contact depths are determined.

While the instrument shown in FIGS. 2, 5 and 6 is described as being conveyed into and out of a wellbore by an armored electrical cable, it should be clearly understood that other embodiments of a gravity/gravity difference instrument according to the invention may be adapted to be conveyed by other means known in the art, such as drill pipe, coiled tubing, measurement while drilling systems and the like. Other embodiments may be mounted permanently in a wellbore, such as in special housings or receptacles coupled to the well casing. Other embodiments may include having sensors according to the invention permanently disposed in each of a plurality of wellbores, spatially distributed within a reservoir, so that any movement of gas/water contact, oil/water contact or gas/oil contact may be monitored frequently without the need to interrupt hydrocarbon production. Advantageously, instruments made according to the embodiment of FIG. 5, for example, require essentially only one optical path between the light source and photodetector to make an array of gravity and gravity difference measurements. Such an arrangement greatly simplifies the design of equipment used to monitor reservoirs.

Embodiments of a gravity/gravity difference instrument according to the various embodiments of the invention also can have the light source and/or photodetector disposed at the earth's surface, rather than in a wellbore. As is known in the art, photoelectronics are preferably kept away from high temperature environments. Embodiments of an instrument according to the invention which include a light source and photodetector at the earth's surface may be less failure prone than other designs which provide the source and detector in the instrument housing itself. Well logging cables are known in the art which include optical fibers therein for transmitting light from the earth's surface to a well logging instrument and back again. See for example, U.S. Pat. No. 5,495,547 issued to Rafie et al.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A gravity difference sensor, comprising:
    a first mass adapted to free fall when selectively released, the first mass having optical elements thereon adapted to change a length of an optical path through the sensor in response to movement of the first mass;
    a second mass adapted to free fall when selectively released, the second mass having optical elements thereon coupled in optical series with the optical elements on the first mass, the optical elements on the second mass adapted to change a length of the optical path through the sensor in response to movement of the second mass in a sense opposite to the change in length effected by movement of the first mass; and
    a beam splitter operatively coupled to an output of the optical path traversed by the sensor, one output of the splitter coupled substantially optically directly to an interferometer, another output of the splitter coupled to the interferometer through an optical delay line.

2. The gravity difference sensor as defined in claim 1 wherein the first mass and the second mass are disposed in a same housing at spaced apart positions.

3. The gravity difference sensor as defined in claim 1 wherein the optical elements on the first mass and the second mass comprise reflectors.

4. The gravity difference sensor as defined in claim 1 further comprising a drop controller adapted to time selective dropping of the first mass and the second mass so that there is at least partially time coincident movement of the first mass and the second mass.

5. The gravity difference sensor as defined in claim 1 wherein the optical elements on the first mass and the second mass comprise optical path splitters adapted to cause a light beam passing through the optical elements to traverse a distance between the optical elements and an optical target a plurality of times, whereby a the change in length of the optical path effected by movement of the first mass and the second mass is a multiple of a change in distance between the first mass and the second mass and the optical target.

6. The gravity difference sensor as defined in claim 1 wherein the optical delay line comprises a selected length of optical fiber.

7. The gravity difference sensor as defined in claim 1 wherein the optical delay line provides a time delay at most equal to an expected fall time of at least one of the first mass and the second mass.

8. The gravity difference sensor as defined in claim 1 further comprising a plurality of masses each adapted to free fall when selectively released, the plurality of masses each having optical elements thereon coupled in optical series with the optical elements on the first mass and the second mass, the optical elements on the plurality of masses adapted to change a length of the optical path through the sensor in response to movement of each of the plurality of masses, each such change in length for each one of the plurality of masses being in a sense opposite to the change in length effected by movement of a one of the plurality of masses in optical series before and after each one of the plurality of masses.

9. The gravity difference sensor as defined in claim 8 further comprising a drop controller adapted to selectively drop the first mass, the second mass and each of the plurality of masses, the drop controller adapted to time the selective dropping of each of the masses so that there is at least partially time coincident movement of each pair of masses adjacent to each other in optical series.

10. The gravity difference sensor as defined in claim 1 further comprising optical elements disposed on the first mass adapted to change the length of the optical path a multiple of a movement distance of the first mass within the sensor.

11. A method for measuring gravity difference, comprising:
    illuminating optical elements on a first mass adapted to free fall when released, the optical elements adapted to change a length of an optical path in response to movement of the first mass;
    serially illuminating optical elements on a second mass adapted to free fall when released, the optical elements adapted to change a length of an optical path in response to movement of the second mass, the change in length effected by movement of the second mass having a sense opposite to the change in length effected by the first mass;
    dropping the first mass at a selected time;
    dropping the second mass at a selected time, the dropping the second mass timed to provide at least some time coincident movement of the first mass and the second mass;
    splitting light traveling away from the optical elements;
    conducting one output of the splitting substantially directly to one input of an interferometer;
    conducting another output of the splitting to the interferometer through a selected time delay; and
    determining a frequency of an interference pattern in the interferometer during the at least partially time coincident movement, the frequency related to gravity difference between a position of the first mass and a position of the second mass.

12. The method as defined in claim 11 further comprising:
    prior to the splitting, directing light leaving the optical elements on the second mass to optical elements on each of a plurality of masses each adapted to free fall when selectively released from an initial position, the optical elements on each of the plurality of masses connected in optical series and adapted to change the length of the optical path in response to the dropping of each of the plurality of masses, the change in length caused by each of the plurality of masses having a sense opposite to the change in length of the previous one of the plurality of masses in the optical series;

selectively dropping each one of the plurality of masses, the selective dropping timed to provide at least partially time-coincident movement of pairs of series-adjacent ones of the plurality of masses; and determining a frequency of an interference pattern in the interferometer in response to the time-coincident movement of the pairs series-adjacent ones of the plurality of masses, the frequency thereof corresponding to a difference in gravity between positions of each mass in each of the pairs of series-adjacent ones of the plurality of masses.

13. The method as defined in claim 11 further comprising causing light to traverse a path between the first mass and an optical target a plurality of times so that the change in length of the optical path is a multiple of a movement distance of the first mass.

14. A well logging instrument, comprising:

a chassis adapted to be lowered into a wellbore;

a first sensor disposed on the chassis, the first sensor comprising a first mass adapted to free fall when selectively released, the first mass having optical elements thereon adapted to change a length of an optical path through the sensor in response to movement of the first mass;

a second sensor disposed on the chassis at a position spaced apart from the first sensor, the second sensor having a second mass adapted to free fall when selectively released, the second mass having optical elements thereon coupled in optical series with the optical elements on the first mass, the optical elements on the second mass adapted to change a length of the optical path through the sensor in response to movement of the second mass in a sense opposite to the change in length effected by movement of the first mass; and a beam splitter operatively coupled to an output of the optical path traversed by the sensor, one output of the splitter coupled substantially optically directly to an interferometer, another output of The splitter coupled to the interferometer through an optical delay line.

15. The well logging instrument as defined in claim 14 further comprising a drop controller adapted to time selective release of the first mass and the second mass so that there is at least partially time coincident movement of the first mass and the second mass.

16. The well logging instrument as defined in claim 14 wherein the chassis is adapted to be conveyed into a wellbore at one end of an armored electrical cable.

17. The well logging instrument as defined in claim 16 further comprising a light source disposed at the earth's surface, the light source optically coupled to the first sensor by an optical fiber disposed in the well logging cable.

18. The well logging instrument as defined in claim 14 further comprising a plurality of sensor disposed on the chassis at spaced apart positions, each sensor having a mass adapted to free fall when selectively released, the masses each having optical elements thereon coupled in optical series with the optical elements on the first mass and the second mass, the optical elements on the plurality of masses adapted to change a length of the optical path through each sensor in response to movement of each of the plurality of masses, each such change in length for each one of the plurality of masses being in a sense opposite to the change in length effected by movement of a one of the plurality of masses in optical series before and after each one of the plurality of masses.

19. The well logging instrument as defined in claim 18 further comprising a drop controller adapted to selectively drop the first mass, the second mass and each of the plurality of masses, the drop controller adapted to time the selective dropping of each of the masses so that there is at least partially time coincident movement between each pair of masses adjacent to each other in optical series.

20. The well logging instrument as defined in claim 14 further comprising a gravity orientation sensor coupled to the chassis, the orientation sensor adapted to generate a signal corresponding to a direction of earth's gravity with respect to the chassis.

21. The well logging instrument as defined in claim 20 wherein the first sensor and the second sensor are each mounted to the chassis in a moveable framework.

22. The well logging instrument as defined in claim 14 further comprising optical elements disposed on the first mass and adapted to the change length of the optical path a multiple of a movement distance of the first mass within the first sensor.

23. The well logging instrument as defined in claim 14 further comprising optical elements disposed on the second mass and adapted to the change length of the optical path a multiple of a movement distance of the second mass within the second sensor.

24. A method for well logging, comprising:

(a) inserting a well logging instrument into a wellbore drilled through earth formations, the instrument comprising a first gravity sensor and a second gravity sensor spaced apart from the first gravity sensor;

(b) illuminating optical elements on a first mass in the first sensor, the optical elements on the first mass adapted to free fall when released, the optical elements on the first mass adapted to change a length of an optical path in response to movement of the first mass;

(c) serially illuminating optical elements on a second mass in the second sensor, the optical elements on the second mass adapted to free fall when released, the optical elements on the second mass adapted to change a length of an optical path in response to movement of the second mass, the change in length effected by movement of the second mass having a sense opposite to the change in length effected by the first mass;

(d) dropping the first mass at a first selected time;

(e) dropping the second mass at a second selected time, the dropping the second mass timed to provide at least some time coincident movement of the first mass and the second mass;

(f) splitting light traveling away from the optical elements;

(g) conducting one output of the splitting substantially directly to one input of an interferometer;

(h) conducting another output of the splitting to the interferometer through a selected time delay;

(j) determining a frequency of an interference pattern in the interferometer during the at least partially time coincident movement, the frequency related to gravity difference between a position of the first mass and a position of the second mass; and (k) moving the instrument along the wellbore and repeating (a) through (j).

25. The method as defined in claim 24 further comprising repeating (a) through (j) at selected time intervals to determine movement of a fluid contact in a reservoir penetrated by the wellbore.

26. The method as defined in claim 25 further comprising repeating (a) through (j) at selected time intervals in a plurality of wellbores to determine spatial distribution of a fluid contact in the reservoir.

27. The method as defined in claim 24 further comprising:
prior to the splitting, directing light leaving the optical elements on the second mass to optical elements on each of a plurality of masses each adapted to free fall when selectively released from an initial position, the optical elements on each of the plurality of masses connected in optical series and adapted to change the length of the optical path in response to the dropping of each of the plurality of masses, the change in length caused by each of the plurality of masses having a sense opposite to the change in length of the previous one of the plurality of masses in the optical series;
selectively dropping each one of the plurality of masses, the selective dropping timed to provide at least partially time-coincident movement of pairs of series-adjacent ones of the plurality of masses; and
determining a frequency of an interference pattern in the interferometer in response to the time-coincident movement of the pairs series-adjacent ones of the plurality of masses, the frequency thereof corresponding to a difference in gravity between positions of each mass in each of the pairs of series-adjacent ones of the plurality of masses.

28. The method as defined in claim 24 further comprising:
determining an orientation of the logging instrument with respect to earth's gravity; and
adjusting a measure of gravity difference between the first sensor and the second sensor with respect to a true vertical separation between the first sensor and the second sensor.

29. The method as defined in claim 24 wherein the inserting the well logging instrument is performed by extending an armored electrical cable into the wellbore.

30. The method as defined in claim 24 wherein the inserting the well logging instrument is performed by extending a drill pipe into the wellbore.

31. The method as defined in claim 24 further comprising causing light to traverse an optical path between the first mass and an optical target a plurality of times so that the change in length of the light path in the first sensor is a multiple of a distance of movement of the first mass.

32. The method as defined in claim 24 further comprising causing light to traverse an optical path between the second mass and an optical target a plurality of times so that the change in length of the light path in the second sensor is a multiple of a distance of movement of the second mass.

* * * * *